United States Patent [19]
Larsson et al.

[11] Patent Number: 5,530,800
[45] Date of Patent: Jun. 25, 1996

[54] METHOD FOR RELATIONS RECOVERY OF A DATA BASE IN CASE OF ERRORS

[75] Inventors: Bo E. S. Larsson, Huddinge; Iván M. Sanchez, Stockholm; Hed J. Sintorn, Uppsala, all of Sweden

[73] Assignee: Telefonaktiebolaget LM Ericsson, Stockholm, Sweden

[21] Appl. No.: 162,763

[22] Filed: Dec. 8, 1993

[30] Foreign Application Priority Data

Dec. 8, 1992 [SE] Sweden ................................. 9203690

[51] Int. Cl.⁶ ..................................................... G01R 31/28
[52] U.S. Cl. ................... 395/181; 395/600; 395/182.13; 364/282.1; 364/282.3; 364/283.4
[58] Field of Search ................................. 395/575, 600, 395/900, 800, 181, 182.13, 182.18; 364/282.1, 282.3, 283.4, 974.4; 371/12, 19, 72

[56] References Cited

U.S. PATENT DOCUMENTS

| | | | |
|---|---|---|---|
| 4,627,019 | 12/1986 | Ng ........................................ | 364/900 |
| 4,933,848 | 6/1990 | Haderle et al. ......................... | 364/300 |
| 5,006,978 | 4/1991 | Neches ................................... | 364/282.4 |
| 5,021,993 | 6/1991 | Matoba et al. ......................... | 364/900 |
| 5,043,871 | 8/1991 | Nishigaki et al. ...................... | 364/200 |
| 5,065,311 | 11/1991 | Masai et al. ............................ | 364/268.9 |
| 5,201,044 | 4/1993 | Frey, Jr. et al. ....................... | 395/575 |
| 5,247,664 | 9/1993 | Thompson et al. .................... | 395/600 |
| 5,247,692 | 9/1993 | Fujimura ................................ | 395/800 |
| 5,291,594 | 3/1994 | Sekiguchi et al. ..................... | 395/600 |
| 5,295,256 | 3/1994 | Bapat ..................................... | 395/500 |
| 5,333,314 | 7/1994 | Masai et al. ........................... | 395/575 |

FOREIGN PATENT DOCUMENTS

| | | |
|---|---|---|
| 336546 | 10/1989 | European Pat. Off. . |
| 336549 | 10/1989 | European Pat. Off. . |
| 351210 | 1/1990 | European Pat. Off. . |
| 2252853 | 8/1992 | United Kingdom . |

*Primary Examiner*—Robert W. Beausoliel, Jr.
*Assistant Examiner*—Dieu-Minh Le
*Attorney, Agent, or Firm*—Burns, Doane, Swecker & Mathis

[57] ABSTRACT

A system for recovery of relations in a data base in case of errors, comprises functionality executed by a computer and ensuring that data in the data base are structured as items of data in a number of recovery sub-systems, each item of data belonging to only one sub-system. If a sub-system contains one or more items of data that depend on one or more items of data in another sub-system, the first mentioned sub-system is marked as depending on the second mentioned sub-system. If a first sub-system is marked as depending on a second sub-system which is marked as depending on a third sub-system, the first sub-system is recursively marked as depending on the third sub-system. Furthermore no two sub-systems are marked as depending on each other. Integrity constraints between an item of data in one sub-system and an item of data in another sub-system are admitted provided that one of these sub-systems is marked as depending on the other one. Recovery actions are performed on a sub-system so as to only result in changing items of data of that sub-system and of sub-systems marked as depending on it.

16 Claims, 3 Drawing Sheets

METHOD FOR RELATIONS RECOVERY OF A DATA BASE IN CASE OF ERRORS

BACKGROUND

The present invention relates to a system for relations recovery in case of errors.

In a data base system there are many measures which can be taken against loss of information. Normally backup copies and logs are used for securing that there is an extra copy of the data base. These are used for restoring the data base in case of system breakdown or hard ware errors.

A data base normally has a recovery function responsive for data stored in the data base being consistent, i.e. having a state to be expected with regard to different updates and their grouping.

For enabling recovery from errors writing the data base to breakdown a backup version has to be safely stored. A backup contains all information necessary for being able to recreate the data base to the same consistent state as prevailed at the time when the backup was created.

A typical strategy for recovering a data base can be summarized as follows:

If the data base has become inconsistent due to a catastrophic error having occurred, the recovery function orders restart with reloading of the data base to the latest backup version. In order to enable return to a more current state the data base is then updated with information that has been stored on a log, i.e. a history of earlier operations stored in a memory which is used by the recovery function for restoring the latest allowed transactions, i.e. operations on objects or records in the data base. The concept of object is here intended to have the conventional meaning within the data processing art. In short an object is an information packet with an associated description of how to manage its information. The objects are, as are also the data records, divided into classes after their area of use, and are identified by means of keys. A more detailed description of the concept of object can be found e.g. in "OBJECT-ORIENTED ANALYSIS" by Peter Coad and Edward Yourdon, Yourdon Press Computing Series.

The information and mechanisms required for recovery of the data base are determined by the method chosen for updating the data base. In the case of updating an object a copy of the original object is created, a lock is put in order to prevent other users from updating the data base and not until at commitment, i.e. the transaction operation used by a program or an operator for indicating that a current transaction has been ended and that its effects shall remain, the updated copy is introduced and put locks are released.

In cases where an error in the data base can not be detected immediately a data base copy is not enough. In a bank register an operator may e.g. by mistake remove a customer record despite the fact that there still exist associated account entries, or he may happen to remove all payment complaints.

In the first case there are well known means for securing data integrity. These are called integrity conditions. Such a condition could, e.g. be that account entries must be associated with a customer register. There could also exist established recovery mechanisms prescribing what shall happen if an integrity condition is violated. In the above example a definite removal of the customer record could be necessarily preceded by successive liquidating steps leading to the removal also of account entries together with the customer record.

In the second case, with all payment complaints removed, it is essential to be able to restore removed records from a backup copy. On the other hand, it is essential that not all data in the data base are restored, e.g. twelve hour old entries regarding bank transactions. Even if it would be possible to find and restore only records regarding payment complaints from the backup, while keeping the rest of the data base up to date, also all violations of integrity conditions must be able to be found and corresponding recover measurements be taken that are required for restoring the integrity of the data base. However, it may then be difficult to secure that not still more important data are destroyed through these measures, e.g. bank transactions.

In a conventional data base management system the function to recover part systems is implemented by the use of completely different data bases. This involves that there are no guaranties for consistency between the different recovery part systems, and no integrity conditions (such as existence dependency) are fullfilled between objects in different data bases and part systems.

Through U.S. Pat. No. 4,933,848 a data base management system is known in which demands are put on data that they shall have referential constraints. The data base is a relation data base in which data is stored in tables having rows and columns. New rows are loaded and information regarding these and their constraints are extracted and sorted. The new rows are checked for constraint violations and the violations are rectified to restore the referential integrity.

United Kingdom Patent Publication GB 2,252,853 generally relates to storing and recovering data in a relation data base.

SUMMARY

It is an object of the invention to create, while simultanously allowing continuous access to a data base, a system for relation recovery in the data base securing that data is always in a consistent state and the consequences of a data breakdown are limited to the greatest possible extent.

According to the invention a system for recovery of relations in a data base in case of errors, comprises functionality executed by a computer and ensuring that:

data in the data base are structured as items of data in a number of recovery sub-systems, each item of data belonging to only one sub-system, if a sub-system contains one or more items of data that depend on one or more items of data in another sub-system, the first mentioned sub-system is marked as depending on the second mentioned sub-system, if a first sub-system is marked as depending on a second sub-system which is marked as depending on a third sub-system, said first sub-system is recursively marked as depending on said third sub-system, no two sub-systems are marked as depending on each other integrity constraints between an item of data in one sub-system and an item of data in another sub-system are admitted provided that one of these sub-systems is marked as depending on the other one, and recovery actions are performed on a sub-system so as to only result in changing items of data of that sub-system and of sub-systems marked as depending on it.

There follows a number of advantageous embodiments of the invention, as will appear from the account given immediately below.

A first embodiment comprises taking, simultaneously with performing backup of one sub-system, also consistent copies of all sub-systems marked as depending on this backed up sub-system.

A second embodiment comprises performing, in case of recovering a sub-system from a backup copy, also recovery of sub-systems marked as depending on this sub-system.

A third embodiment comprises, performing in connection with a recovery operation of a sub-system only actions resulting in said sub-system anew reaching a consistent state.

A fourth embodiment comprises performing only such measures in connection with a recovery operation of a sub-system, which do not affect other sub-systems than those marked as depending on this sub-system.

A system according to the invention can be of the kind referred to in the introduction given above, in which data are described and arranged in accordance with an object oriented language of the kind where by the concept object is meant an information packet with an associated description of how to manage its information. This will also appear further from the below given more detailed description of embodiments with respect to the drawings.

Also in such a system there follows a number of advantageous embodiments of the invention, as will appear from the account given immediately below.

One such embodiment comprises performing, if in case of recovery of relations conflicting values appear between objects in two different recovery sub-systems, a resetting method for replacing the conflicting values with a value fulfilling all validity constraints.

For that purpose attributes of the objects may be reset to a value compatible with the environment by a simple assignment in order not to create any dependency from other objects and not fail.

In a further embodiment the status of the objects may be changed if in case of recovery of relations conflicting values appear between objects in two different recovery sub-systems.

For that purpose either a reference or one or both of the objects may be removed.

In still a further embodiment a system according to the invention comprises checking relations on which an object depends by requesting verification from all objects located at the other end of involved dependency relations, and running relation controls should there be a risk for appearance of errors.

In a further embodiment relation checks may be performed on an object so as to include resetting of the object in case of errors, and informing objects having dependency relations to this object that these relations depend upon an object which has been changed.

In a still a further embodiment directed to the case that recovery operation occurs in which an object is included, either attributes of the object are reset, relations are removed from the object, or the object is removed, depending upon that specified as a recovery action for its relations.

Data base operations should be allowed on checked objects before all other objects have been checked, in accordance with a further embodiment.

In still a further embodiment a recovery handler initiates recovery of relations by marking all affected objects with a flag informing that the object is located in a relation recovery system, that has been rewound, and the relations of which have not been fully recovered, and that the object has not been checked since rewinding, starting a relation recovery handler, allowing data base operations.

The relation recovery handler may preferably go through the rewound recovery system for removing existing relation problems and thereby having most of these removed before opening involved objects by some application.

BRIEF DESCRIPTION OF THE DRAWINGS

Embodiments of the invention will now be described more closely with reference to the enclosed drawings, on which FIG. 1 schematically illustrates one of the problems which have resulted in the present invention.

DETAILED DESCRIPTION

In the description given below a number of different actors, functions and actions are described. In this context it should be noted that, unless stated otherwise, it is the question of software functionality executed by a computer, not shown. Such computer and the way it executes may be of a kind evident to the man of the art reading the description below and need therefor not be described here. The code used in the description is a pseudo code for C++ and should also be well known to the man of the art.

In accordance with one of the characterizing features of the invention the invention is based on the use of recovery sub-systems, between which there can exist certain dependency relations which will be described more closely below. These recovery sub-systems are used for limiting a problem to the application which has caused it. In a data base this involves that there are functions for enabling rewinding, without reloading the log, of parts of the data base without rewinding the whole data base. The examples described below are based on the presumption that there exist several levels in a hierarchy of recovery sub-systems.

Figure 1:
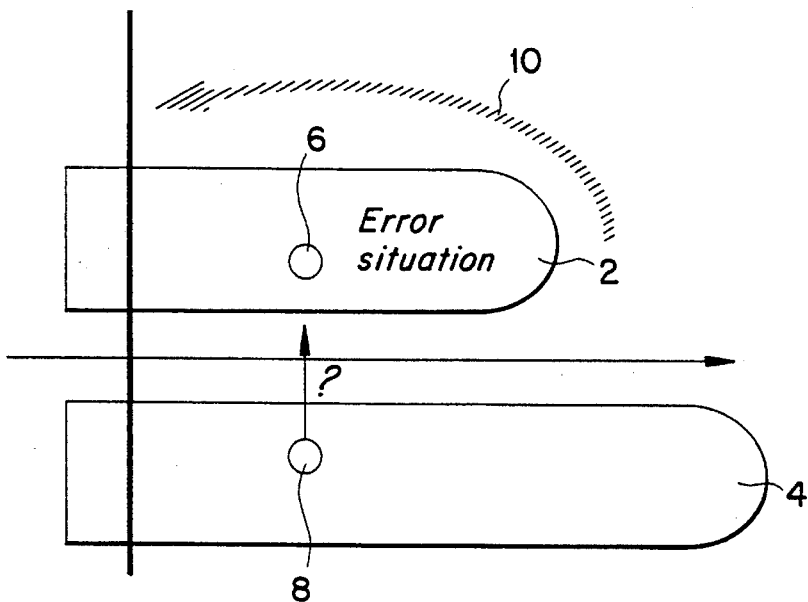

In the diagram in FIG. 1 the horizontal axis is a time axis. The intersecting vertical axis indicates the point of time of the latest backup. The upper and lower areas 2 and 4, respectively, are intended to illustrate courses of events in an "upper" and a "lower" recovery sub-system. The small round unshadowed areas 6 and 8 in the respective "courses of events" indicate objects between which there exists a dependency relation. At the end of the course of events 2 in the upper recovery sub-system there occurs a fault situation necessitating rewinding of this recovery part system, indicated by an arrow 10.

The question, indicated with an arrow 12, is now what happens with the relation between the object 8 and the object 6 which is non-existing after the rewinding.

The above, illustrated with reference to FIG. 1, is intended to illustrate one of the problems which have been solved by the present invention. More particularly, this problem is to secure that integrity constraints extending over more than one data base record and more than one recovery sub-system still are valid after backing of one of the sub-systems.

Part of the solution is to determine a number of attributes assigned to the objects, as well as relation recovery methods for different situations.

Below examples are given of a number of attributes. The abbreviation DOL used below in the name of the attributes originates from Data Object Logic, the meaning of which is evident.

Attributes

DOL.Foreign_Dependency

This is a one bit flag included in transaction protocol, transaction log and backup. If set, the flag means that the object has a direct dependency relation to objects in another, lower recovery part system. It is set by the relation logic when the first direct dependency has been established and is removed when the last direct dependency has been removed. Only direct dependencies are relevant, and thus no indirect ones.

The flag is used by a relation recovery agent for finding objects which can be "roots" of problem hierarchies. It may therefor suitably be included as a bit in a catalogue of objects.

DOL.Not_OK

This is a one bit flag which need not be included in the transaction log and need not be rewound. However, zero setting must be included in the transaction protocol. If set, the flag means that the object is included in a recovery sub-system, which has been rewound, and the relations of which are not completely recovered, and that the object has not been checked since rewinding.

The flag is set for all objects in case of rewinding and is unset for each object when checked. When the relation recovery agent has checked all objects having the flag ForeignDependency set, all Not_OK flags can be unset. Also this flag is suitably included as a bit in the object catalogue.

DOL.Depend_on_me

This is a list of references included in the transaction protocol, the transaction log and backup. The list includes referencies to all objects having a direct dependency on the self-object, and are maintained by the relation logic of DOL.

It is used for alarming dependent objects if the self-object was crashed and has been recovered by the relation recovery function.

DOL.Depending_on

This is a list of references included in the transaction protocol, the transaction log and backup. The list includes references to the objects to which the self-object has direct dependences, and is maintained by the relation logic of DOL.

It is used for creating knowledge of those objects which must be checked before the self-object may be guaranteed to be correct (by the method Verify, which is described below). Suitably, the flag is implemented with such enumeration of the references of the object that those references carrying dependences are known.

DOL.Rec_Status

Only used in opened objects during the relation recovery, does not need to be stored, and states whether the self-object is included in a dependency tree which is being verified (Verifying_Self) for avoiding circularities, must be checked when the verification is done (Must_Check), has already been reset (Reset) and shall thus not be reset again; or if nothing particular is applicable (Normal)

The DOL.Rec_Status is maintained and used by the relation recovery functionality.

The denominations stated above within brackets are used below in connection with a description of recovery methods.

RecDB.Rewind_Timestamp

RecDB (Recovery Data Base) included in the name means recovery data base. It is the question of a time stamp indicating when the recovery sub-system and hence the recovery data base was rewinded last.

It is used by the recovery functionality for creating knowledge of objects which have not been rewinded and which may therefor have incompatible data. It is set by a recovery handler in connection with rewinding.

Relation Recovery Methods

For simplification of the description it is pretended somewhat incorrectly that the objects may open themselves and that they may respond that they do not exist or that something else has locked them. Compare also the embodiments described more in detail below.

In the description below the definitions of the methods are stated as type-of-object.name-of-method(type-of-argument formal_name). This shall be interpreted such, as for objects of the type type-of-object, the method name-of-method is defined which takes an argument of the type type-of-argument. In the definitions the argument is stated with the designation formal_name.

Calling a method in accordance with name-of-method(argument) shall be interpreted as calling the method carrying the name name-of-method with the value of the argument stated within the brackets.

A response from a method call is stated either as response code or response code(definition) where the response code indicates the response with a definition, if any, within the brackets.

Dol.Verify(Transaction TR

If the object is locked by another transaction the response LOCKED should be used.

If the object has NOT_OK flag unset or if it is already opened in the transaction TR, the response V_Ready should be used with the last rewinding time of the part systems as an argument.

If the object is not opened and if it has NOT_OK flag set, it will be opened with a writing lock in TR.

The attribute Rec_Status is set to Verifying_Self. Verify(TR) is sent further (recursively) to the objects from which the self-object depends. If anyone of the objects is locked the attempt is abandoned and the response V_locked should be used. If all objects respond with a correct rewinding time and if the Alert method of the self-object has not been called (i.e. Rec.Status has been set to Must_Check, cf below), the answer V_ready(Rewinding time) should be used and Rec-.Status is set to Normal. Otherwise the method Check(TR) of the self-object is called. If it is satisfied the answer is V_Ready(Rewinding time).

DOL.Check(Transaction TR)

The relation checks of the object are started. If they are satisfied, the attribute Rec_Status is set to Normal.

If something is wrong, Reset(TR) is executed and Alert(TR) (see below) is called for all objects which depend on the self-object.

DOL.Reset(Transaction TR)

The attributes of the object attain their zero setting values, or else the object is removed, depending of that specified as relation recovery action.

The attribute Rec.Status is set to Reset.

There are four kinds of actions such a recovery method is able to combine:

Setting of attribute. Quite simply the status of the object is reset to something compatible with the environment. The attribute setting must be a simple assignment since, on the one hand, it must not depend on other objects— they are the ones causing problems—and, on the other hand, must not fail, since there is no "old value" to return to.

Removal of reference. This is the normal way to act with references to objects not existing. This is suitable in case of optional references which have disappeared, but may also be usable in case of cardinality errors, or even state errors.

Removal of the object. This can be suitable in case of existence dependency, or possibly in case of cardinality dependency. If the object is removed there is no reason to use any of the two actions mentioned above.

Send a notification to some agent. This action may be used e.g. if it is desirable to inform operators or similar.

DOL.Alert(Transaction TR)

If the object is locked by some other transaction LOCKED is returned.

If the object is not open, it is opened with write lock in TR and if it has NOT_OK flag set, it effects Verify(TR) on it self. Possibly existing error codes are returned, otherwise Check(TR) of the self-object is called and error codes or A_Ready are returned.

If the object is open and is busy verifying it self, i.e. Rec_Status is Verifying_Self or Must_Check, Rec_Status is set to Must_Check. A_Ready is returned.

If the object has already made reset, i.e. Rec_Status is Reset. A_Ready is returned, since it is not possible any more to set the object to zero.

In remaining cases Check(TR) is called, and its error codes or A_Ready is returned.

Addition to opening of data base objects

This is an addition to the usual method of opening an object functioning as usual, if not Not_OK flag is set. In such case a new transaction is started and Verify of the self-object is called.

If LOCKED (or some other error code) is obtained in return the transaction TR is interrupted and the answer will be "Relations not fully recovered". The opening is failed.

If V_Ready(TR) is obtained in return the transaction is commited and the opening is carried through as usual.

Addition to the Commit protocol

Each time an object is written as part of a transaction, the Not_OK flag is unset if it was set, since the relation logic is satisfied.

Addition to the relation logic

As soon as a dependency relation is set to an object in another relation recovery data base, the Foreign_Dependency flag is set.

If the last dependency to an object in another relation recovery data base is removed, the Foreign_Dependency flag is unset.

The Foreign_Dependency flag is included in the transaction protocol.

Below the algorithm used in case of relation recovery will be described in short.

Algorithm in Case of Recovery

Relation recovery

The recovery handler of the data base initiates relation recovery by:

Not_OK marking all objects. Most suitably this is done as the object catalog is rebuilt anyhow.

The relation recovery handler (c.f. below) is started. Thereupon the traffic may be turned on. This is needed in all cases when not the whole transaction log for the recovery data base has been read on.

Relation recovery handler

This agent goes through a rewound recovery sub-system in the background. It is not necessary for the consistency of the data base, but removes existing relation problems so as to have most of them removed before objects are opened by some application.

The algorithm is based upon unwinding the problem chains "from below". This is done by going through the object catalogue looking for objects having both the Not_OK flag and the Foreign_Depency flag set. When such an object is found a transaction TR is started and Verify(TR) is sent to the object. If the transaction ends up well it will be committed; if locking appears abort is done and the search is carried on.

When no objects with both Not_OK flag and Foreign_Dependency flag are left, all objects with a direct dependency to another sub-system have been reset and, transitively, also all objects with an indirect dependency. Thus, all NOT_OK flags may be unset.

In the above described implementation there is only one recovery method for each type of objects—i.e. not one for every validity constraint. The reason is performance requirements, but basically it would be very complex relationships between different validity violations and their recovery. For example, one violation could generate a recovery generating a new violation generating a recovery which generates the first violation again. It is, however, conceivable to have an implementation allowing more recovery methods for each type of objects.

Figure 2:
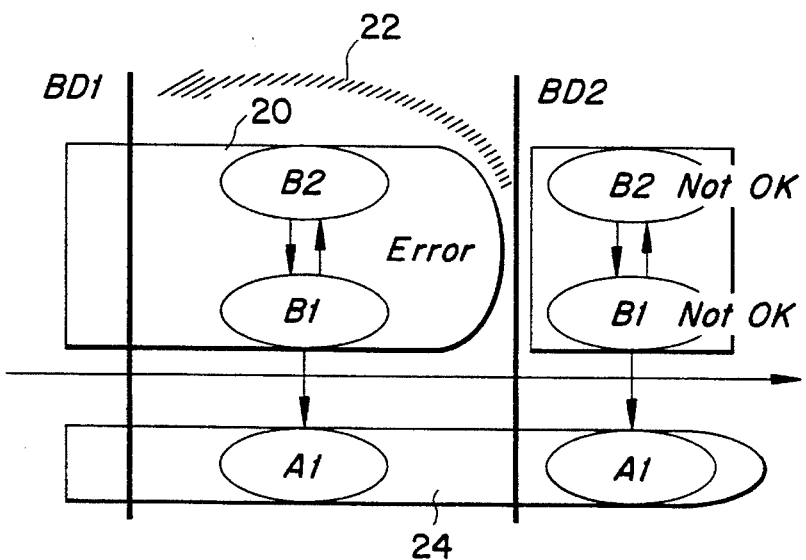
FIG. 2 shows a similar diagram as in FIG. 1 illustrating courses of events in connection with a first example of recovery.

In FIG. 2 a situation is illustrated where a course of events 20 due to an error has been interrupted at the time BD2 in an "upper" recovery data base and the later has been rewinded according to the arrow 22 to the latest backup date BD1. The data base contains the objects B1 and B2, which have a mutual dependency, B1 also having a dependency to an object A1 included in a course of events 24 in a "lower" recovery data base. Nothing has been changed but the objects are not yet checked.

Figure 3:
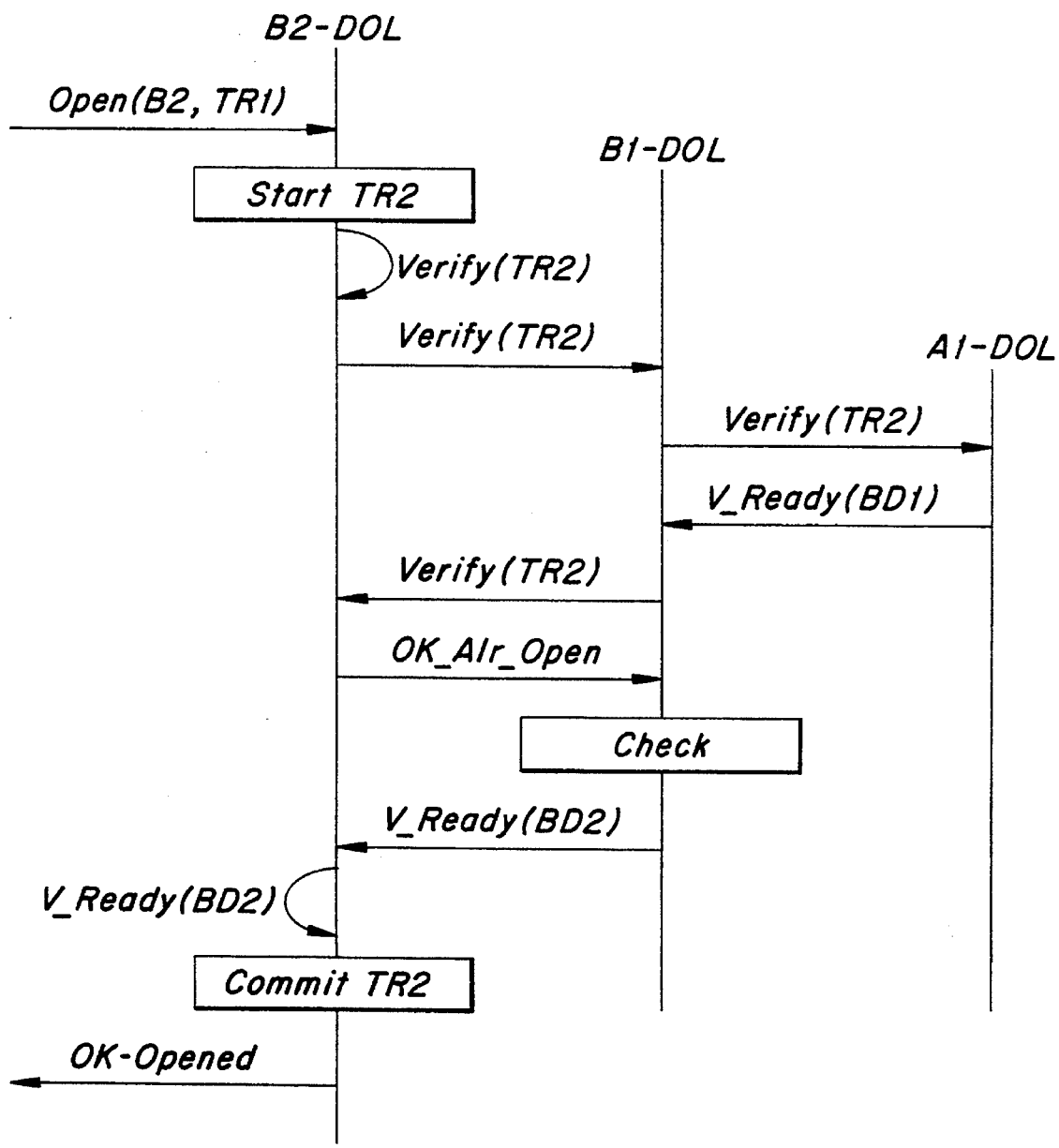
FIG. 3 is a flow chart associated with FIG. 2.

If now someone opens B2, transaction TR1, the following happens with reference to FIG. 3:

At the opening call the logic of B2 discovers that B2 has the Not_OK flag set. Therefor a new transaction TR2 is started which makes a Verify call to B2.

On this call B2 is opened with a write lock and dependencies are investigated. The dependency to B1 is discovered, and a Verify call is made to B1.

Due to the fact that also B1 is Not_OK it is opened with write lock in TR2 and investigates its dependency list. The dependency to A1 is discovered and a Verify call is made to A1.

A1 is OK and answers with its latest rewinding date (BD1). Since this date is not the same as that of B1 it is possible that A1 may include data incompatible with B2.

B1 continues with its list of dependencies and discovers the dependency to B2 and sends a Verify call.

B2 answers directly with its date (BD"), since it is already open and has thus already been verified.

Due to the fact that B1 has received the time stamp BD1 from A1, A1 may be incompatible. Therefor B1 must check itself by running its relation logic (Check).

This finds that everything is in order and B1 answers V_Ready(BD2) to B2.

B2 has no reason to change its mind, or even to run the relation logic, but commits the transaction TR2.

Of this reason the Not_OK flags of B2 and B1 (and A1 which has already been found to be OK) are unset.

B2 can now be opened as usual for the transaction TR1.

Figure 4:
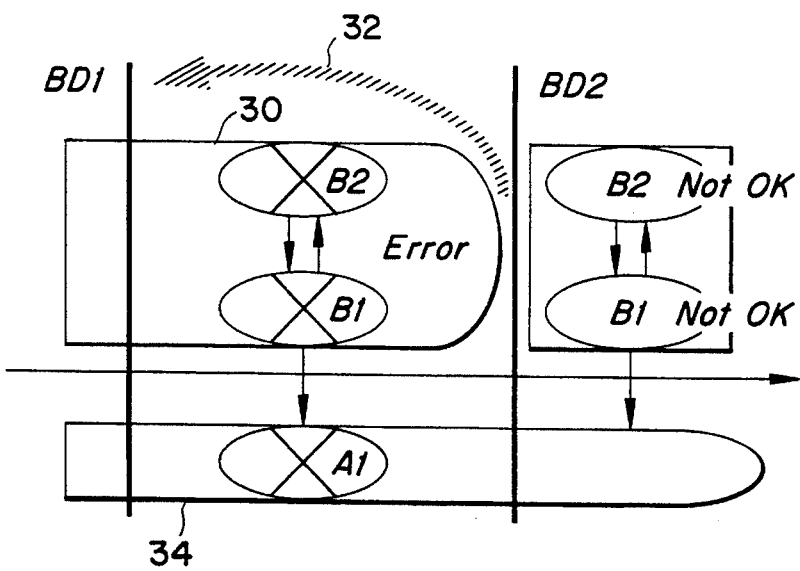
FIG. 4 shows a similar diagram as in FIG. 2 illustrating courses of events in connection with a second example of recovery.

In the second embodiment, indicated in FIG. 4, a course of events 30 has been interrupted at a time BD2 in an "upper" recovery data base and the later has been rewinded in accordance with arrow 32 to the latest backup date BD1. It includes objects B1 and B2, which have a mutual relationship, B1 having also a dependency to an object A1 included in a course of events 34 in a "lower" recovery data base. Since backup, all of the three objects have been removed and A1 does still not exist.

Figure 5:
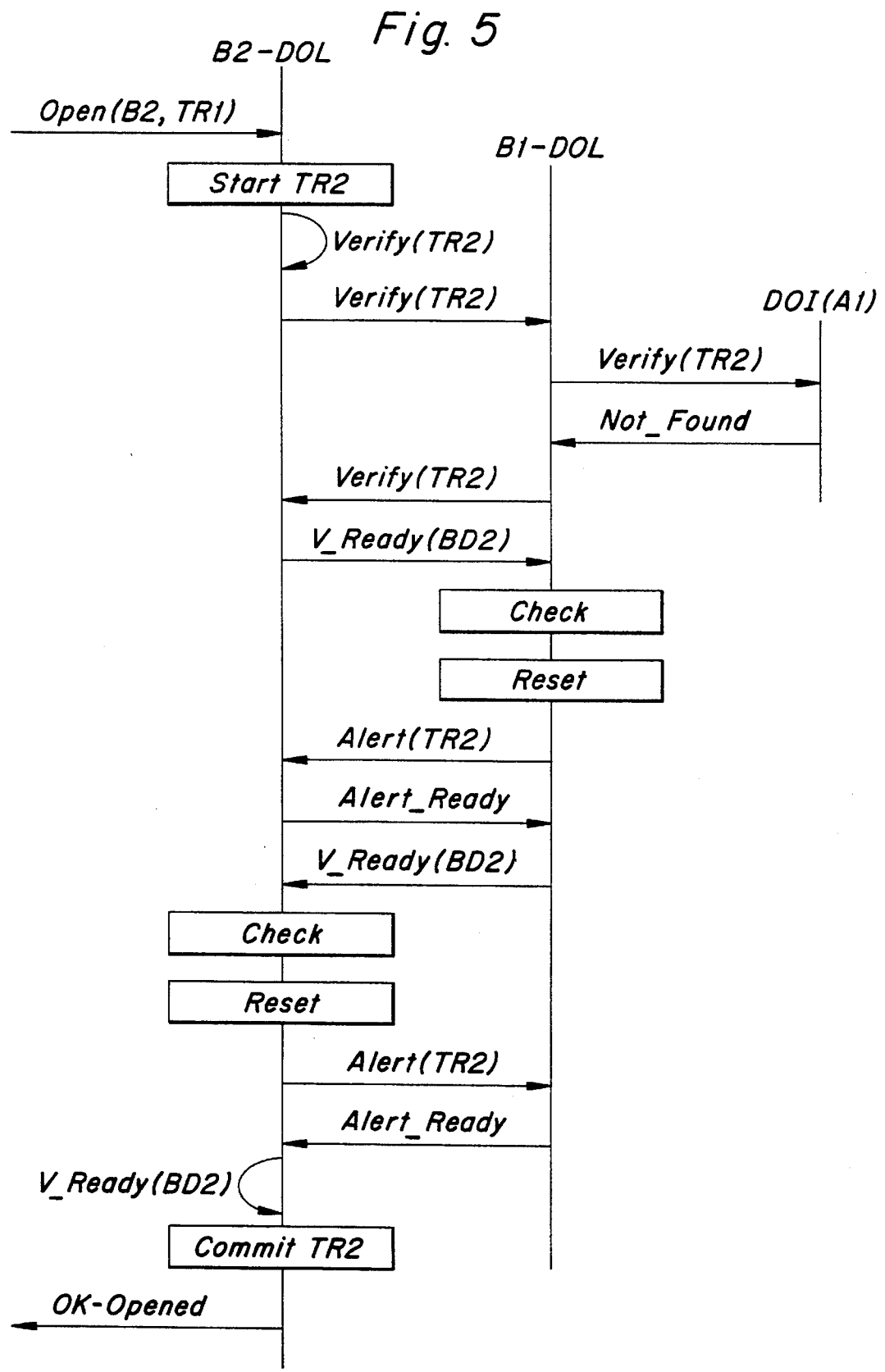
FIG. 5 is a flow chart associated with FIG. 4.

If someone opens B2, transaction TR1, the following happens, with reference to FIG. 5:

At the opening call the logic of B2 discovers that the Not_OK flag of B2 is set. Therefor a new transaction TR2 is started which makes a Verify call to B2.

Due to this call, B2 is opened with write lock and dependencies are investigated. The dependency of B1 is discovered and a Verify call is made to B1.

Due to the fact that also B1 is Not_OK, it opens up with write lock in TR2 and investigates its dependency list. The dependency of A1 is discovered and the Verify call returns Not_Found.

B1 sets its reference to A1 to zero and continues with its dependency list and discovers the dependency to B2 and sends a Verify call.

B2 answers Verify_Ready since it is already keeping on with Verify.

Due to the fact that B1 has received the answer Not_Found, it must check itself by running the relation logic (Check).

This discovers that B1 must be "set to zero" (Reset) due to inconsistency. When this is done all depending on B1 must be informed, and an Alert call must be made to B2.

When B2 receives the Alert call it understands that it must run the relation logic, but this is not done at once since not all of the Verify list has been investigated. It returns Alert_Ready.

B1 is now ready and returns V_Ready (BD2).

B2 has no more objects to verify, but runs the relation logic (Check).

This encounters problems due to the fact that B1 has been changed, and must be reset (Reset). Thereafter all dependent objects must be informed, and an Alert call be sent to B1.

B1 knows that it is already set to zero and therefore immediately answers Alert_Ready.

The transaction TR2 is committed.

Due to this the NOT_OK flags of B2 and B1 are set to zero.

B2 can now be opened as usual for the transaction TR1—but it is set to zero.

What is claimed is:

1. In a computer, a method of recovering relations between objects in a data base in case of errors, wherein data in the data base are structured as items of data in a plurality of recovery sub-systems, each item of data belonging to only one sub-system, comprising the steps of:

if a sub-system contains at least one item of data that depends on an item of data in another sub-system, marking the sub-system as depending on the another sub-system, by setting a flag, if a first sub-system is marked as depending on a second sub-system which is marked as depending on a third sub-system, recursively marking said first sub-system as depending on said third sub-system, wherein no two sub-systems are marked as depending on each other and integrity constraints between an item of data in one subsystem and an item of data in another sub-system are admitted provided that one of these sub-systems is marked as depending on the other one, and recovering data in a sub-system wherein only actions resulting in data in that sub-system reaching anew a state consistent with what is expected are performed, and only items of data of that sub-system and of sub-systems marked as depending on it are changed.

2. A method according to claim 1, further comprising the step of:

taking as consistent, simultaneously with performing backup of a sub-system, copies of all sub-systems marked as depending on the sub-system.

3. A method according to claim 2, further comprising the step of:

recovering, in case of recovering data in a sub-system from a backup copy, data in sub-systems marked as depending on the sub-system recovered from the backup copy.

4. A method according to claim 1, wherein the recovering step affects only those sub-systems marked as depending on the recovered sub-system.

5. A method according to claim 1, wherein data are described and arranged in accordance with an object oriented language in which each object comprises an information packet with an associated description of how to manage its information, and the recovering step includes, when conflicting values appear between objects in two different sub-systems being recovered, replacing the conflicting values with a value fulfilling predetermined validity constraints.

6. A method according to claim 5, wherein attributes of the objects are reset to a predetermined value by a simple assignment so that resetting the attributes does not create any dependency from other objects and does not fail.

7. A method according to claim 1, in which data are described and arranged in accordance with an object oriented language in which each object comprises an information packet with an associated description of how to manage its information, and the recovering step includes changing, when conflicting values appear between objects in two different sub-systems being recovered, a status of the objects.

8. A method according to claim 7, wherein the recovering step includes removing a reference.

9. A method according to claim 7, wherein the recovering step includes removing at least one of the objects.

10. A method according to claim 1, in which data are described and arranged in accordance with an object oriented language in which each object comprises an information packet with an associated description of how to manage its information, and the recovering step includes the step of:

checking relations on which an object depends by requesting verification from all objects located at the other end of the relations, and running relation controls when there is a risk for appearance of errors.

11. A method according to claim 1, in which data are described and arranged in accordance with an object oriented language in which each object comprises an information packet with an associated description of how to manage its information, and the recovering step includes the step of:

performing relation checks on an object so as to include resetting of the object in case of errors, and informing objects having dependency relations to the checked object that these relations depend upon an object which has been changed.

12. A method according to claim 1, in which data are described and arranged in accordance with an object oriented language in which each object comprises an information packet with an associated description of how to manage its information, and the recovering step includes the step of:

performing, in case of a recovery operation in which an object is included, one of resetting attributes of the object, removing relations from the object, and removing the object, as specified by the object's relations.

13. A method according to claim 10, in which data are described and arranged in accordance with an object oriented language in which each object comprises an information packet with an associated description of how to manage its information, and the recovering step includes allowing data base operations on checked objects before all other objects have been checked.

14. A method according to claim 1, in which data are described and arranged in accordance with an object oriented language in which each object comprises an information packet with an associated description of how to manage its information, wherein the computer includes a recovery handler for initiating recovery of relations by marking an affected object with a flag indicating that the object is located in a relation recovery system, that has been rewound, and the relations of which have not been fully recovered, and that the object has not been checked since rewinding, and wherein the recovering step includes the steps of:

starting the relation recovery handler, and allowing data base operations.

15. A method according to claim 14, wherein the relation recovery handler removes most relation problems before objects are opened.

16. In a computer, a method of recovering relations between objects in a data base in case of errors, wherein data in the data base are structured as items of data in a plurality of recovery sub-systems, each item of data belonging to only one sub-system, and integrity constraints extending over more than one item of data and more than one recovery sub-system are still valid after backing up one of the sub-systems, the method comprising the steps of:

if a sub-system contains at least one item of data that depends on an item of data in another sub-system, marking the sub-system as depending on the another sub-system, by setting a flag, if a first sub-system is marked as depending on a second sub-system which is marked as depending on a third sub-system, recursively marking said first sub-system as depending on said third sub-system, wherein no two sub-systems are marked as depending on each other and integrity constraints between an item of data in one subsystem and an item of data in another sub-system are admitted provided that one of these sub-systems is marked as depending on the other one, and recovering data in a sub-system wherein only actions resulting in data in said sub-system reaching anew a state consistent with what is expected are performed, and only items of data of that sub-system and of sub-systems marked as depending on it are changed.

\* \* \* \* \*